March 2, 1948.   A. G. FORSYTH   2,437,189
SELF-CONTAINED UNIT FOR VARIABLE PITCH PROPELLERS
Filed Feb. 25, 1943   14 Sheets-Sheet 1

Inventor
ARCHIBALD GRAHAM FORSYTH,
By Robert B Larson
Attorney

March 2, 1948.  A. G. FORSYTH  2,437,189
SELF-CONTAINED UNIT FOR VARIABLE PITCH PROPELLERS
Filed Feb. 25, 1943  14 Sheets-Sheet 5

Inventor
ARCHIBALD GRAHAM FORSYTH,
By Robert B. Pearson
Attorney

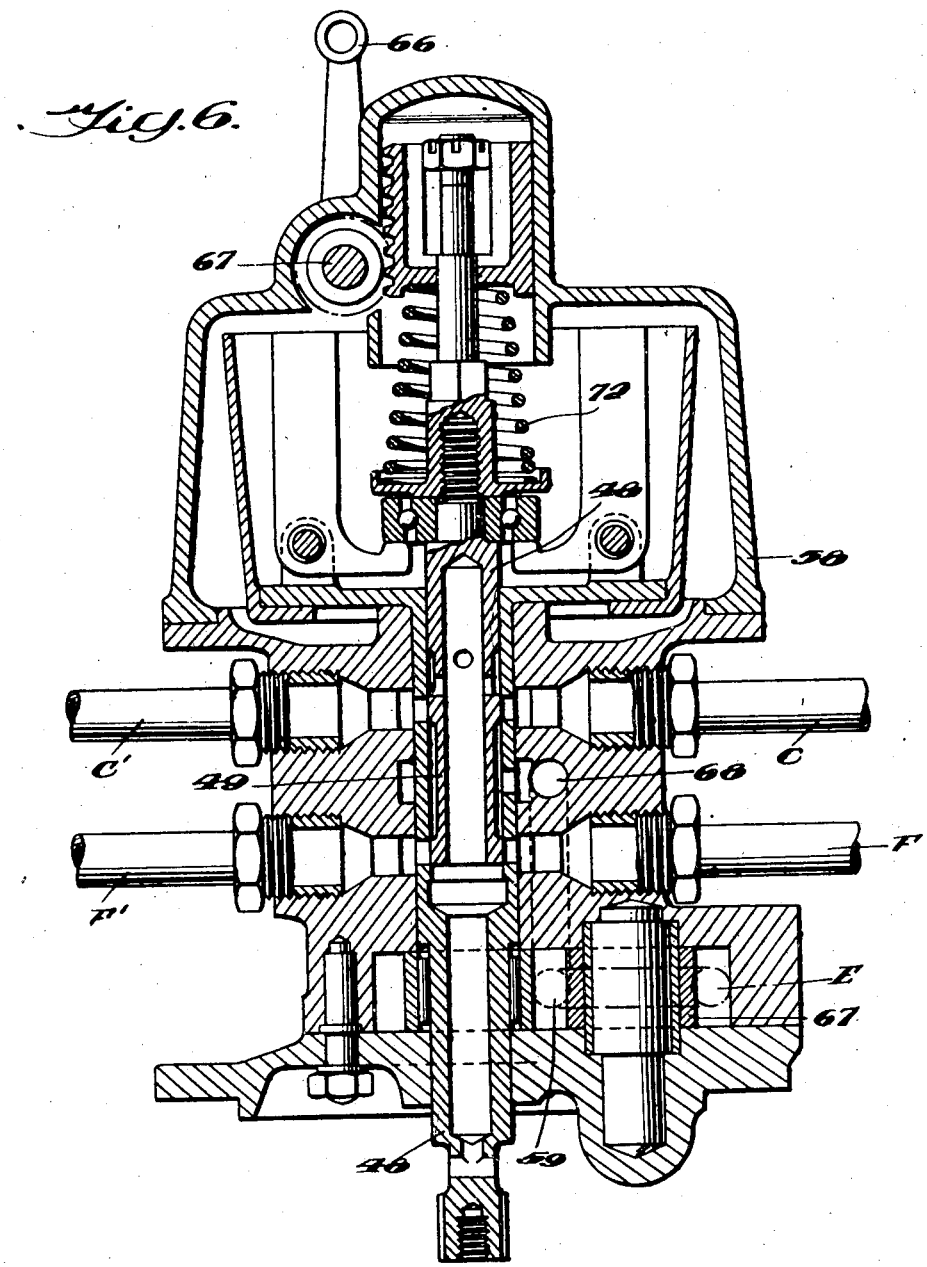

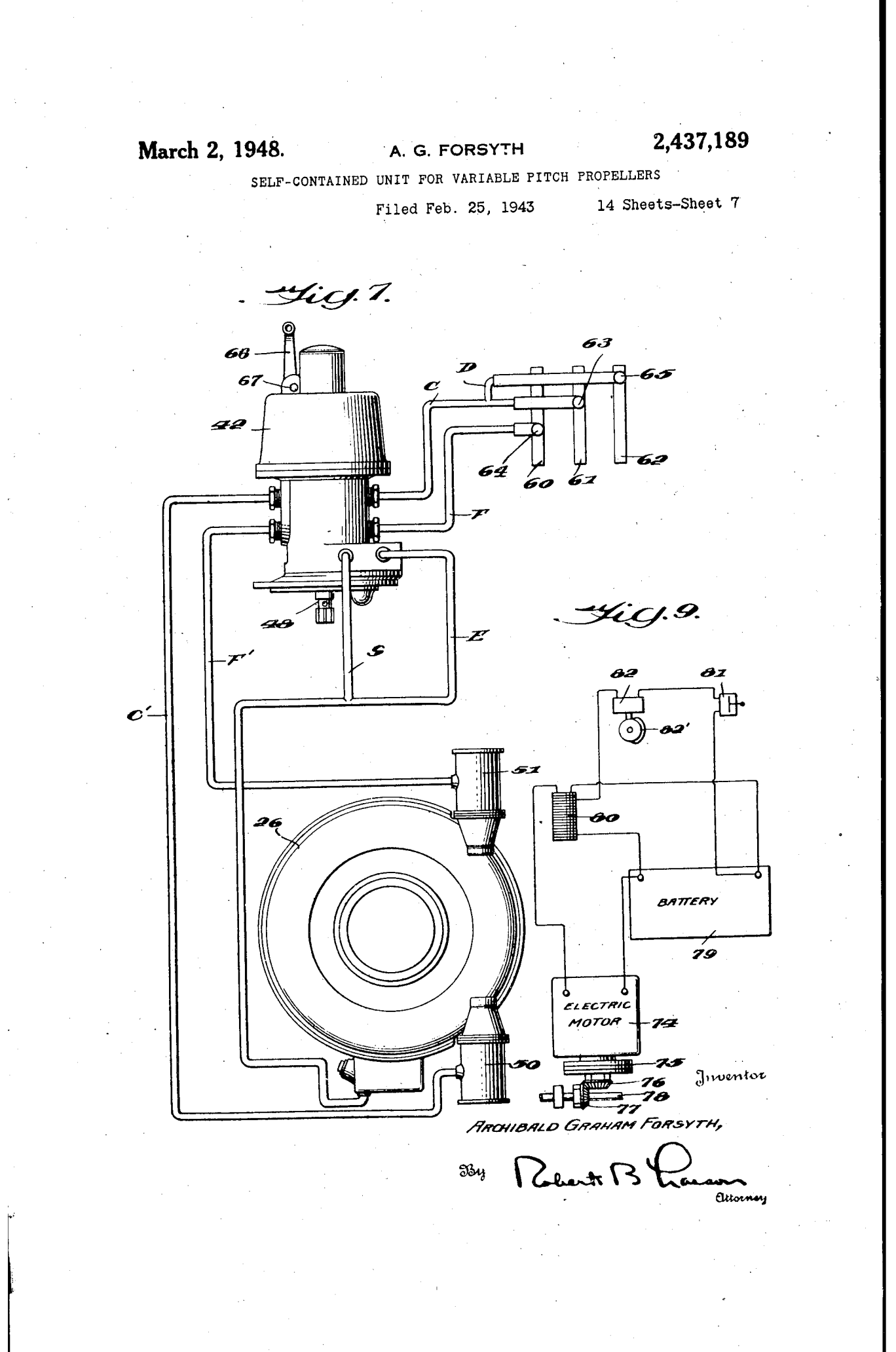

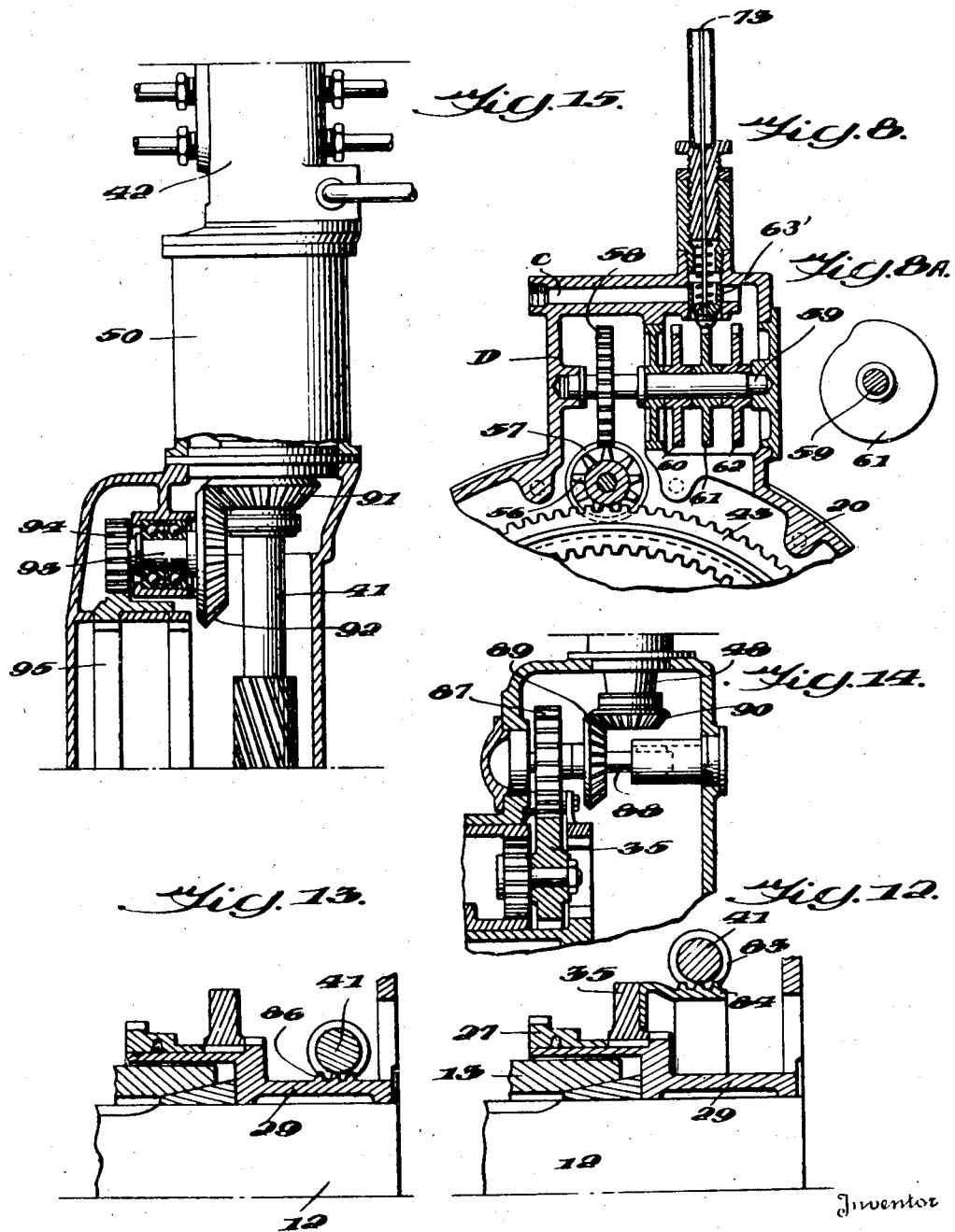

March 2, 1948. A. G. FORSYTH 2,437,189
SELF-CONTAINED UNIT FOR VARIABLE PITCH PROPELLERS
Filed Feb. 25, 1943 14 Sheets-Sheet 9

Inventor
ARCHIBALD GRAHAM FORSYTH,
By Robert B Larson
Attorney

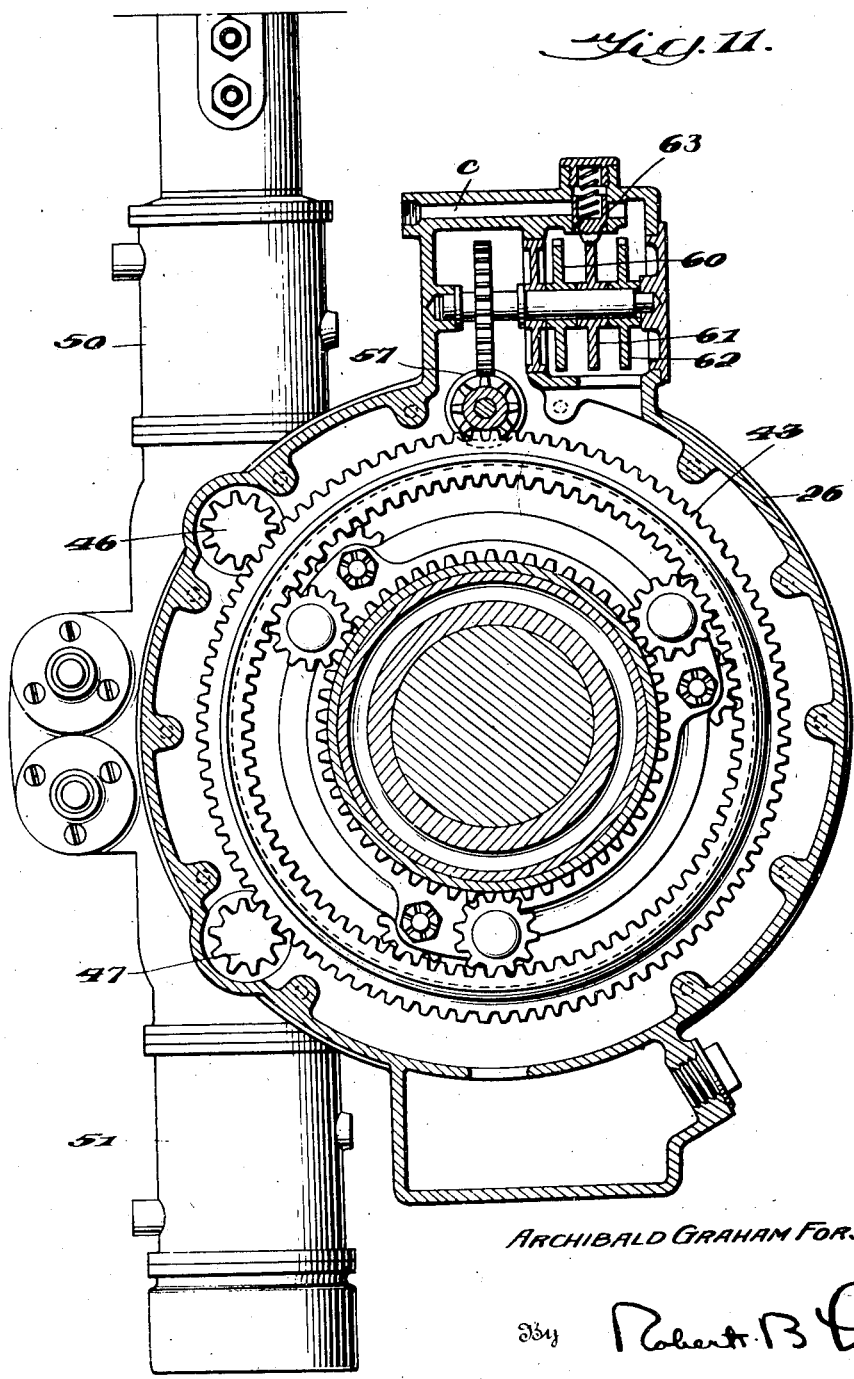

March 2, 1948. A. G. FORSYTH 2,437,189
SELF-CONTAINED UNIT FOR VARIABLE PITCH PROPELLERS
Filed Feb. 25, 1943 14 Sheets-Sheet 11
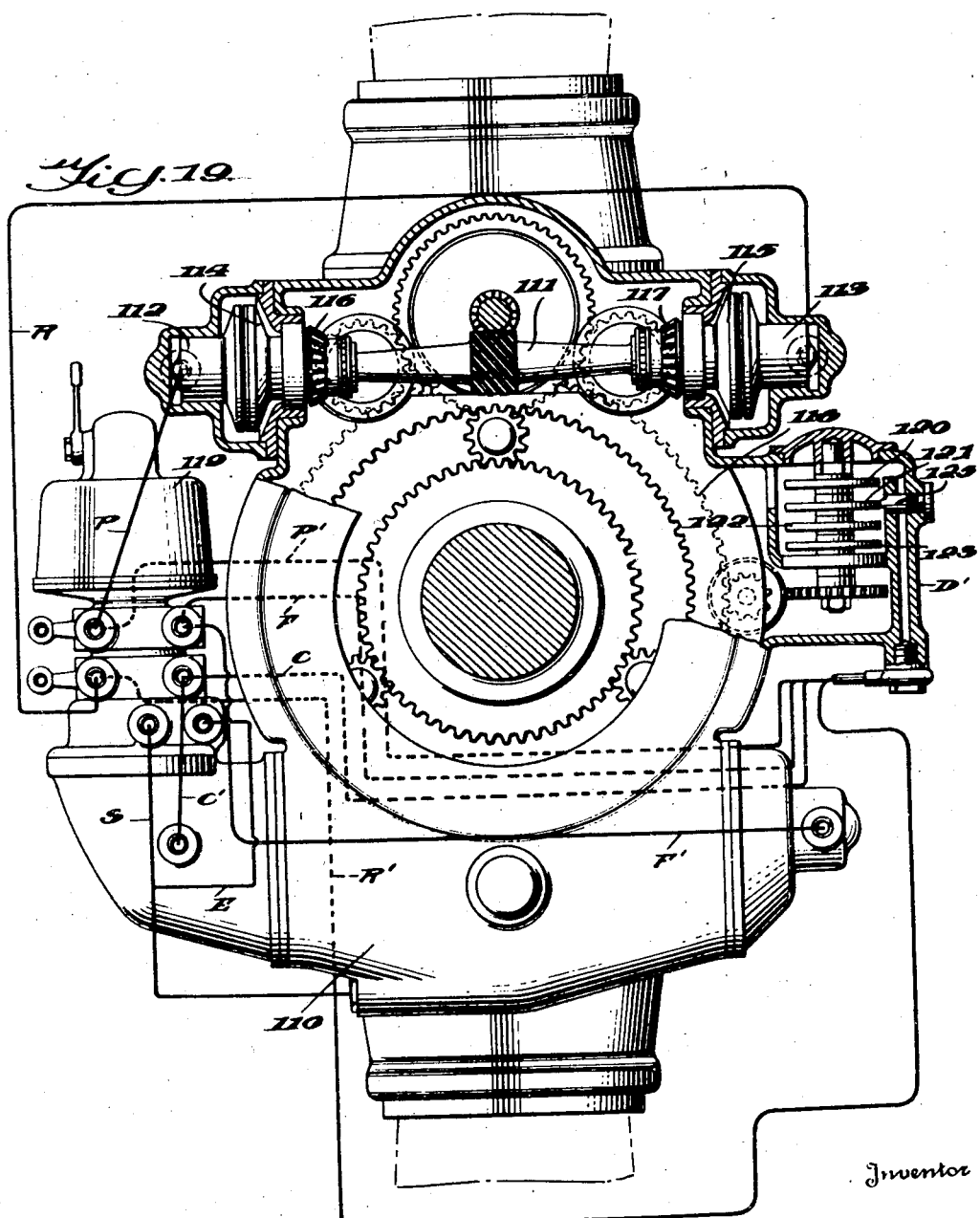
Inventor
ARCHIBALD GRAHAM FORSYTH,
By Robert B. Larson
Attorney

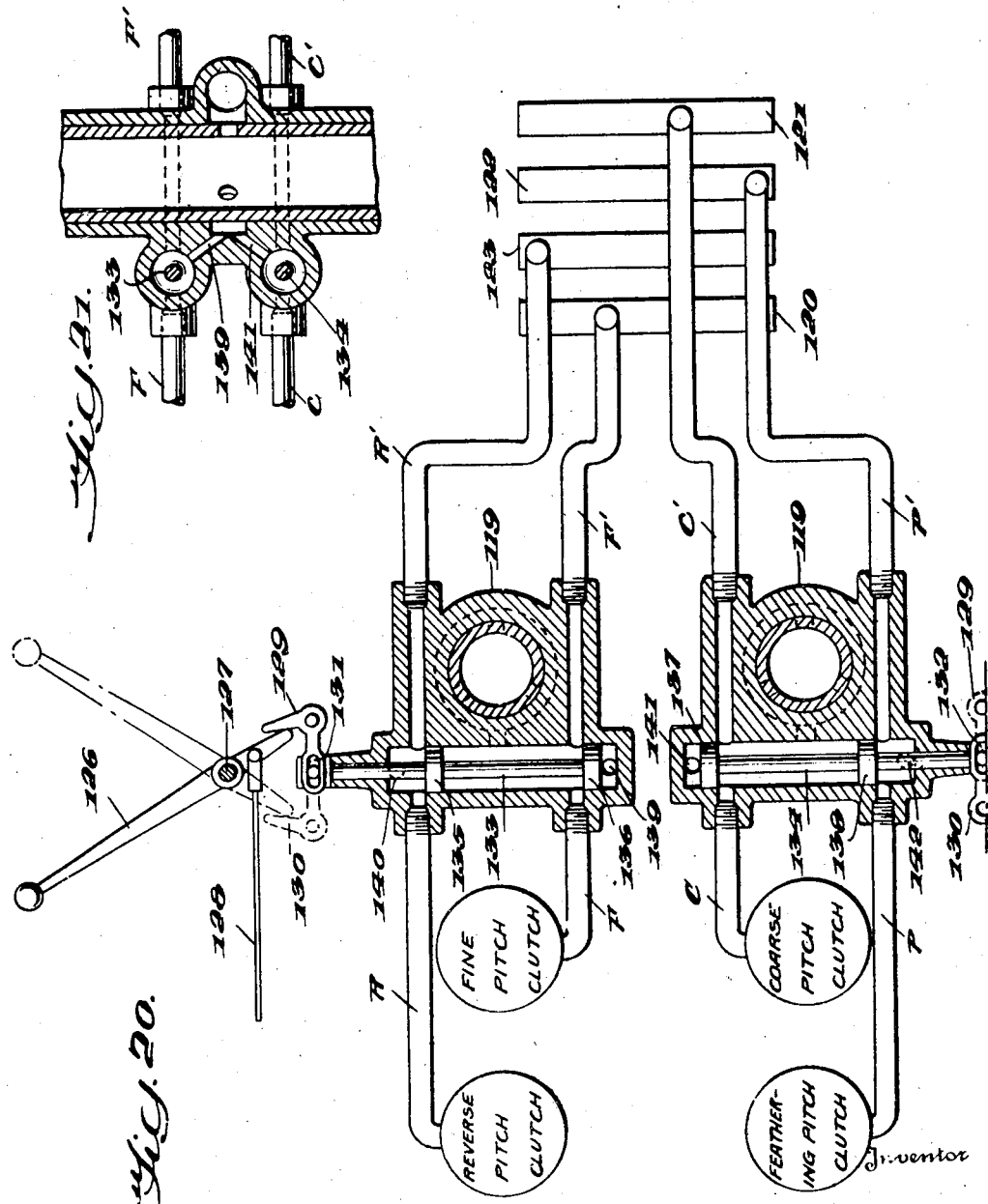

March 2, 1948.     A. G. FORSYTH     2,437,189
SELF-CONTAINED UNIT FOR VARIABLE PITCH PROPELLERS
Filed Feb. 25, 1943     14 Sheets-Sheet 14

Inventor
ARCHIBALD GRAHAM FORSYTH,
By Robert B. Pearson
Attorney

Patented Mar. 2, 1948

2,437,189

UNITED STATES PATENT OFFICE 2,437,189

SELF-CONTAINED UNIT FOR VARIABLE
PITCH PROPELLERS

Archibald Graham Forsyth, Cheam, England, assignor to The Fairey Aviation Company Limited, Hayes, Middlesex, England Application February 25, 1943, Serial No. 477,155

15 Claims. (Cl. 170—163)

1

This invention relates to variable pitch propeller arrangements of the type employing hydraulic control means for varying the pitch of the propeller blades. The present invention constitutes an improvement of the system generally shown in Patent No. 2,161,917, dated June 17, 1939, of which I am a joint inventor.

In accordance with the present invention, the hydraulic control system for effecting changes in pitch to fine pitch, coarse pitch, feathering pitch and reverse pitch positions comprises a self-contained, compact unit. This unit is disposed between the propeller hub structure and the front facing of the internal combustion engine and is so designed as to be readily assembled in position or removed for adjustment or repair. Moreover, its connection with the propeller hub structure is such that the latter may be removed for adjustment and repair without disturbing the control unit. The principal objects of the invention are to provide an arrangement having these advantageous features.

Another object of the invention is to provide in such an arrangement means for effectively driving the shaft of the governor constituting a part of the control system.

A further object resides in the provision of novel governor controlled valve means for the hydraulic system used with means for overriding the governor at will to effect feathering or reverse pitch positions.

A principal object of the invention resides in the arrangement and disposition of the parts which arrangement admirably meets the rigid requirements of the space provided for any self-contained control unit for variable pitch propellers.

These and numerous additional objects will become more apparent from the following description and claims and the accompanying drawings in which:

Figure 5 is a section taken on the line 5—5 of Figure 4;

Figure 6 is a vertical section of the governor and governor controlled valve structure used in this first embodiment;

2

Figure 10:
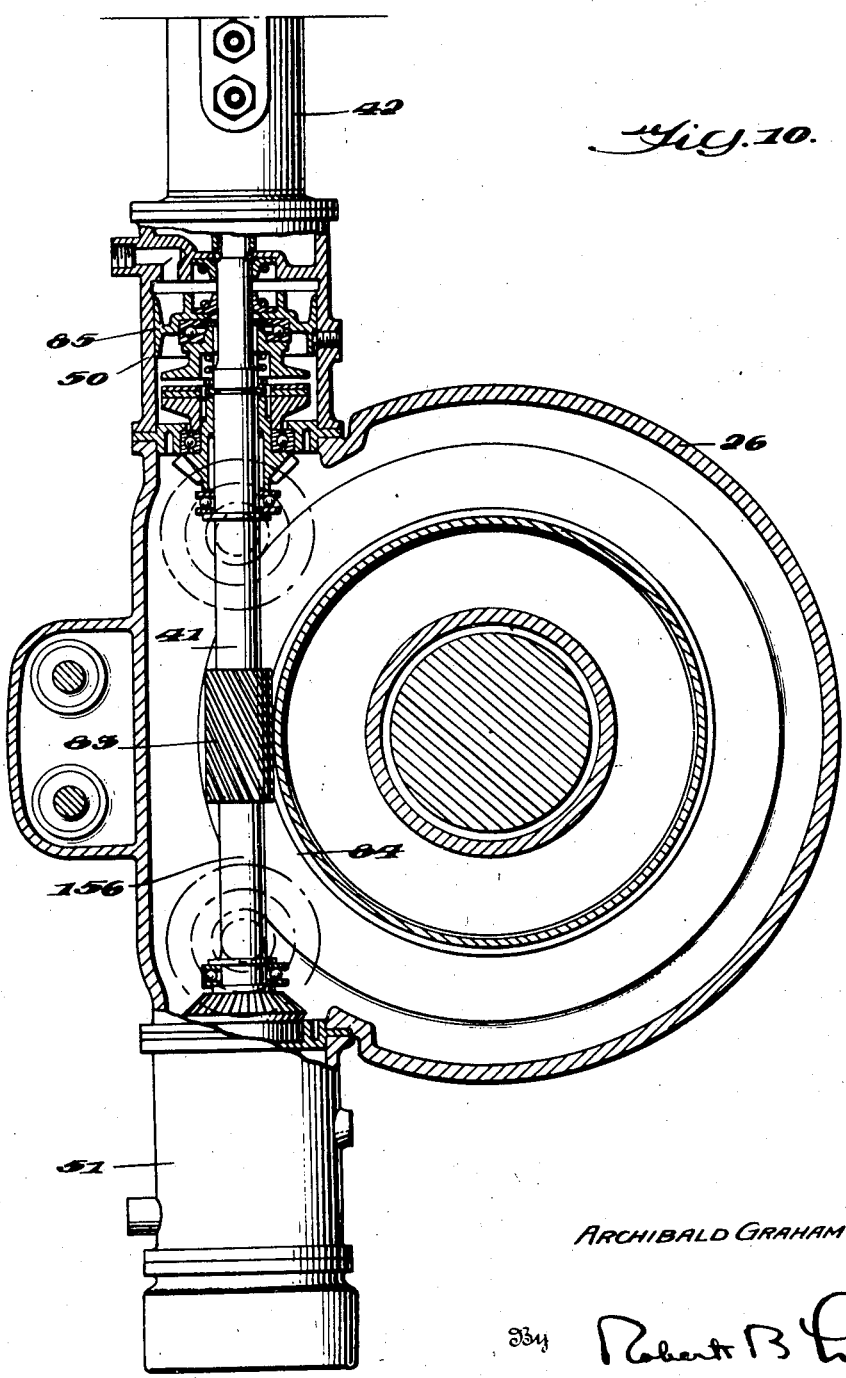
Figure 22:
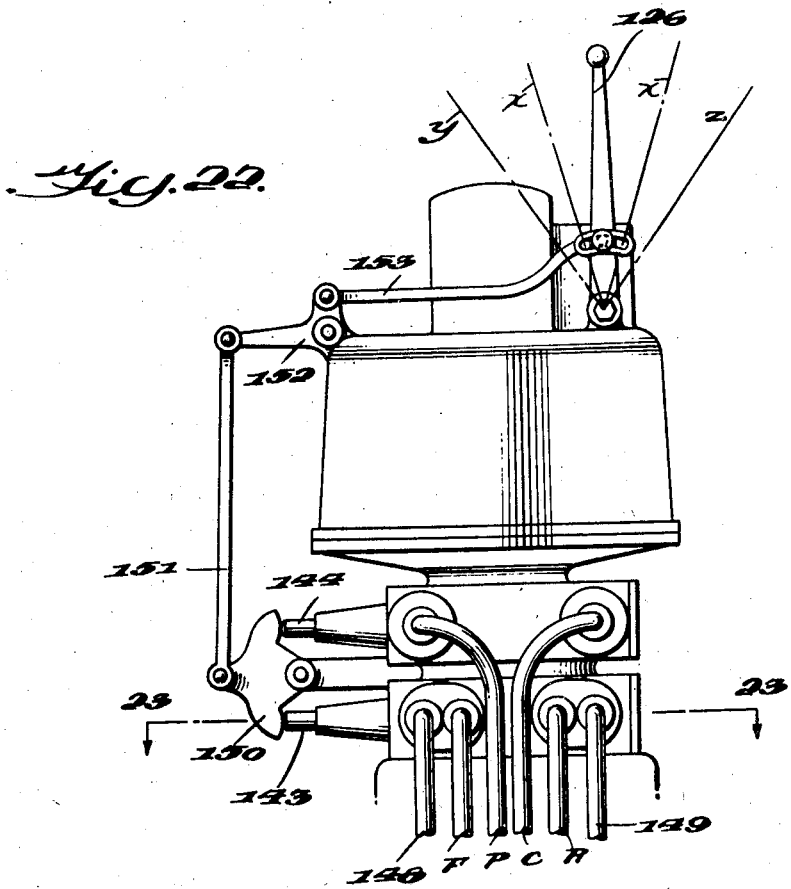
Figure 23:
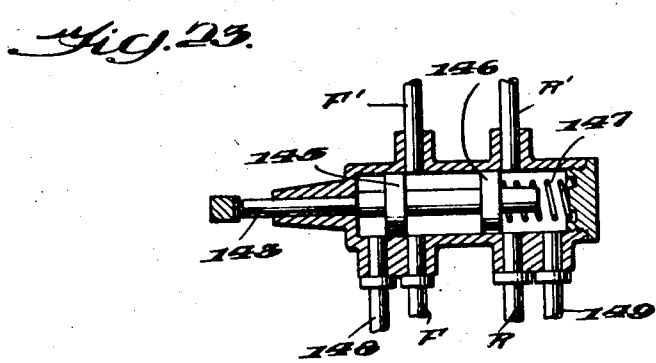

Figure 7 is a diagrammatic view of the hydraulic control system employed;

Figure 8 is a detail sectional view of control cam arrangement;

Figure 8A is an elevation of one of the control cams;

Figure 9 is a circuit diagram of an auxiliary arrangement for feathering the propeller blades upon failure of the internal combustion engine;

Figure 10 is a section through a modified form of control unit;

Figure 11 is a section of the same modification taken through a different vertical plane;

Figure 12 is a detail sectional view showing mechanism for driving the governor drive shaft;

Figure 13 is a similar view showing a different arrangement for the same purpose;

Figure 14 is a detail view showing still a different means for driving the governor;

Figure 15 is a partial sectional detail of a modified form of drive for the pitch changing gearing;

Figures 16, 17 and 18 are diagrammatic views of a modified form of drive for the pitch changing gearing;

Figure 19 is an end elevation, partly in section, showing the application of the invention to a system for effecting fine, coarse, feathering or reverse pitch positions;

Figure 20 is an opened view (diagrammatic) of a governor overriding system;

Figure 21 is a detail section of the same;

Figure 22 is an elevation of another governor overriding arrangement;

Figure 23 is a section taken on the line 23—23 of Figure 22, and

Figure 24:
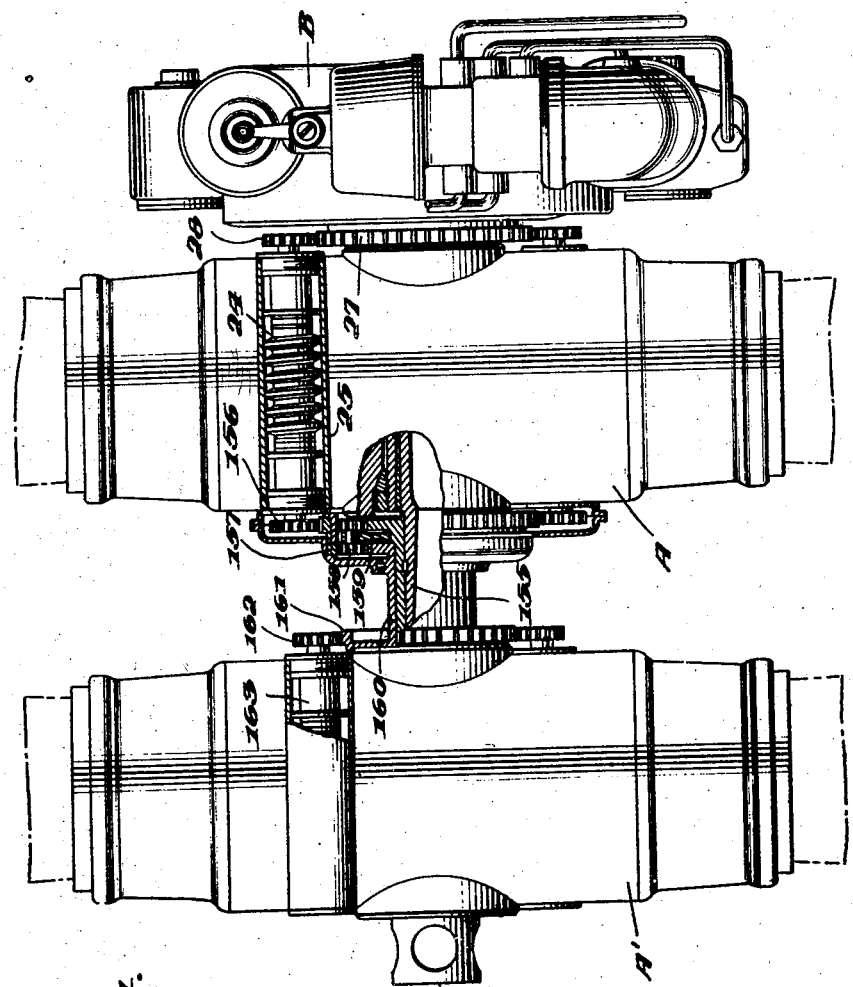

Figure 24 is a side elevation, partly broken away, showing the use of the invention in a system employing contra-rotating variable pitch propellers mounted on co-axial drive shafts.

The self-contained unit disclosed in the embodiment of Figs. 1 to 9, inclusive, is adapted to be mounted on the front facing 10 of the internal combustion engine 11 (Fig. 2) about the propeller drive shaft 12 which projects forwardly of the engine.

The unit has two principal portions, namely, a propeller hub portion A and control portion B. The propeller hub unit A may be similar to that disclosed in my copending applications, Serial No. 464,369, now abandoned, filed November 3, 1942, and Serial No. 472,882, filed January 19, 1943.

In this hub portion A, a hub sleeve 13 is splined on the propeller drive shaft 12 and is removably secured by means of the cone rings or collets 14 and 15, the latter having an inwardly turned locking flange 16 engaging an annular groove in a locking nut 17 threaded on the end of the propeller drive shaft 12. The locking nut is secured in locked position by the locking pins 18, which are disposed in openings in the propeller drive shaft to move radially outward to the position shown in Fig. 2 after the locking nut 17 is in place, after which they are held in that position by wire 19, as described in my copending application to which reference has been made.

A large tubular member 20 has a central transverse opening to permit it to be mounted on the hub sleeve 13 to which it is rigidly secured during manufacture by welding or the like. The ends of the tubular member receive propeller blade root sockets 21 having worm rings 22 secured thereto. The sockets and worm rings are mounted for rotation about the longitudinal axis of propeller blades 23. The worm rings 22 are engaged by a worm 24 mounted in tubular members 25, rigid with tubular member 20 (such as shown in Figure 24 herein), and as clearly illustrated and described in my copending application, Serial No. 472,882, to which reference has already been made.

It will be understood from the description given that rotation of the propeller drive shaft 12 by the internal combustion engine will result in rotating the hub structure and propeller blades 23 about the axis of the propeller drive shaft. It should also be apparent that turning of the worm 24 (by means to be described later) will effect rotary movement of the propeller blades about their longitudinal axes, whereby their pitch may be changed.

The control portion B of the unit is adapted to be disposed between the hub portion A and the front face 10 of the internal combustion engine 11. This control portion B is comprised of a housing 26 and of gearing mechanism therein which includes a ring gear 27 adapted to engage a gear wheel (such as 28 in Fig. 24) on the end of the shaft carrying the worm 24.

Mounted within the housing 26 and keyed as at 9 to the propeller drive shaft 12 is a sleeve 29 of irregular shape and having a flanged portion 30 surrounding the hub sleeve 13. The ring gear 27 is mounted for rotation about the flanged portion 30 of the sleeve 29. The sleeve 29 is provided with gear teeth 31.

Also included within the housing 26 and rigid therewith is a ring member 32 which is coaxially disposed and in alignment with the teeth 31 on the sleeve 29. The ring member 32 is spaced outwardly from the teeth on the sleeve 29 and is provided with gear teeth 33 so that these teeth 31 on the sleeve 32 constitute an annular gear track for the pinions 34 carried by a spider 35.

The spider 35 is annular in shape and is provided with gear teeth 36 on its outer periphery. These teeth are engaged by a gear wheel 37 mounted on and rigid with a worm shaft 38 provided with a worm 39 as clearly shown in Figure 2.

It will now be apparent that rotation of the propeller drive shaft 12 will cause rotation of the spider 35 and in turn drive gear wheel 37, thus rotating the worm shaft 38. The worm 39 engages a worm wheel 40 mounted on a shaft 41 as clearly shown in Figs. 2 and 4. The rotation of the shaft 41 is employed to drive a governor 42 as will be described hereinafter.

The housing 26 further contains a rotatable ring 43 provided with gear teeth on its inner and outer peripheries. This ring 43 is spaced from and in vertical alignment with teeth 44 on the ring gear 27. Pinions 45 (Figure 4) carried by the spider 35 are adapted to engage the teeth 44 on the ring 27 and also the teeth on the inner periphery of the rotatable ring member 43.

Figure 1:
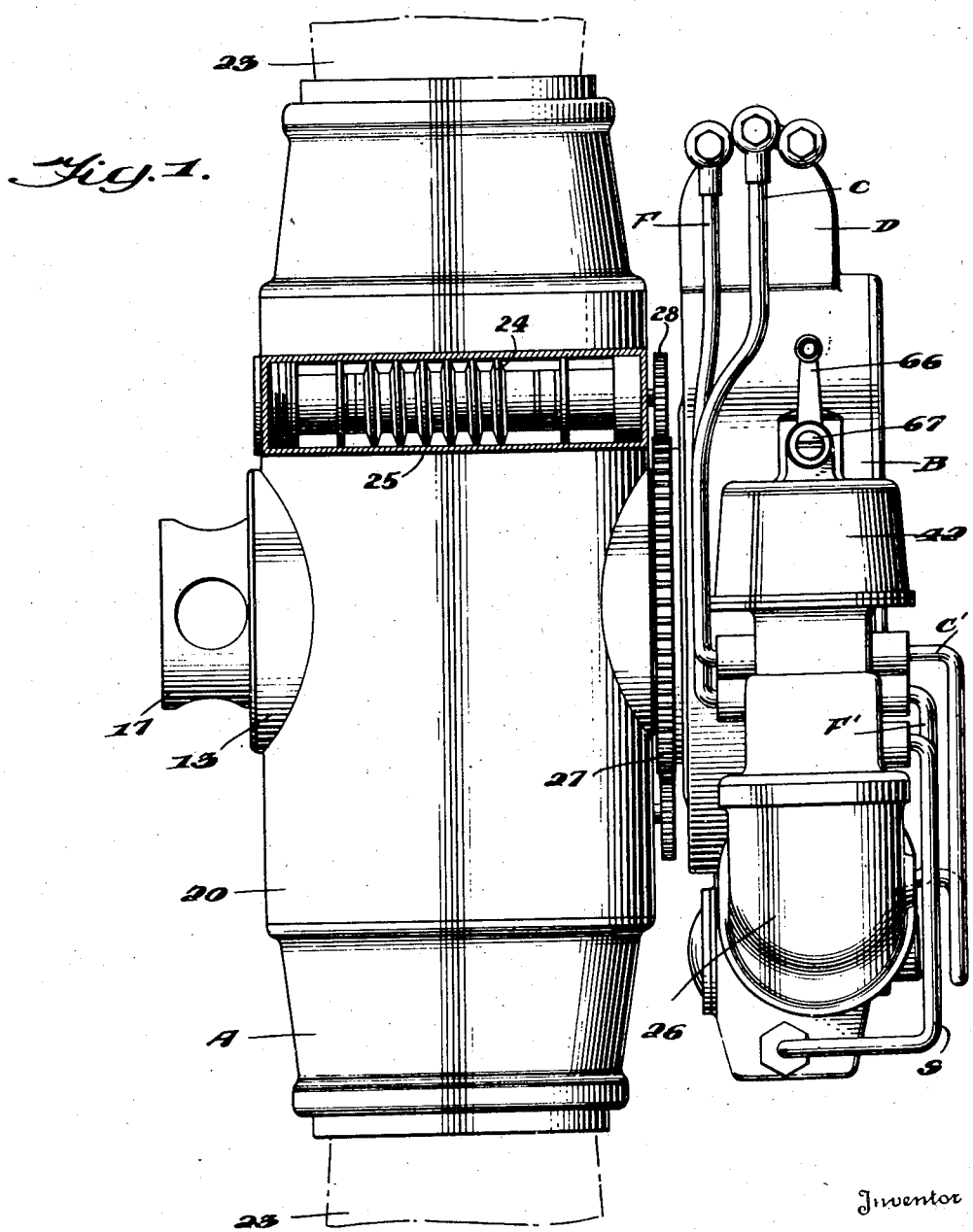
Figure 1 is a side elevation of one embodiment of the invention.
Figure 2:
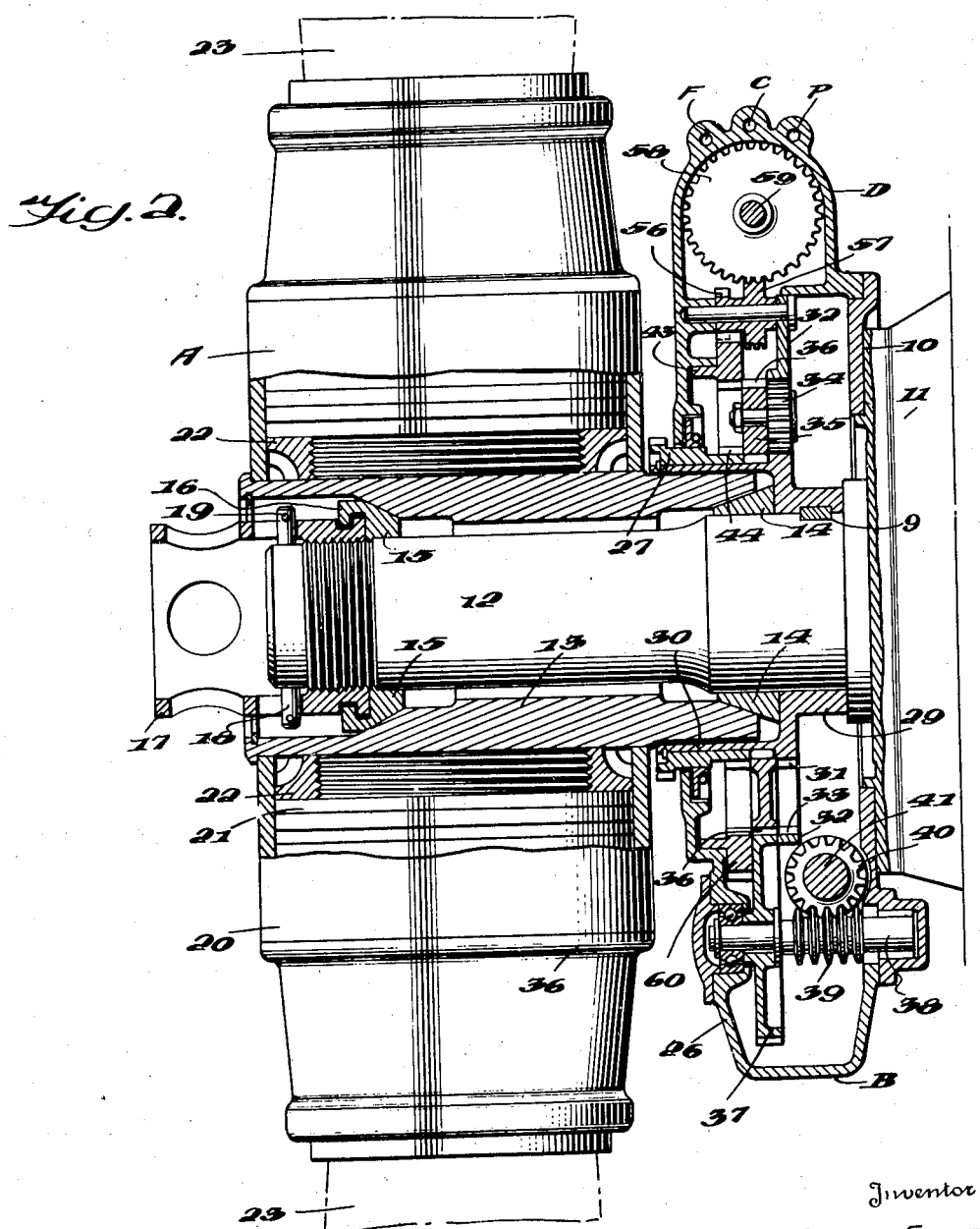
Figure 2 is a similar view with portions in cross section to show interior structure and arrangement.
Figure 3:
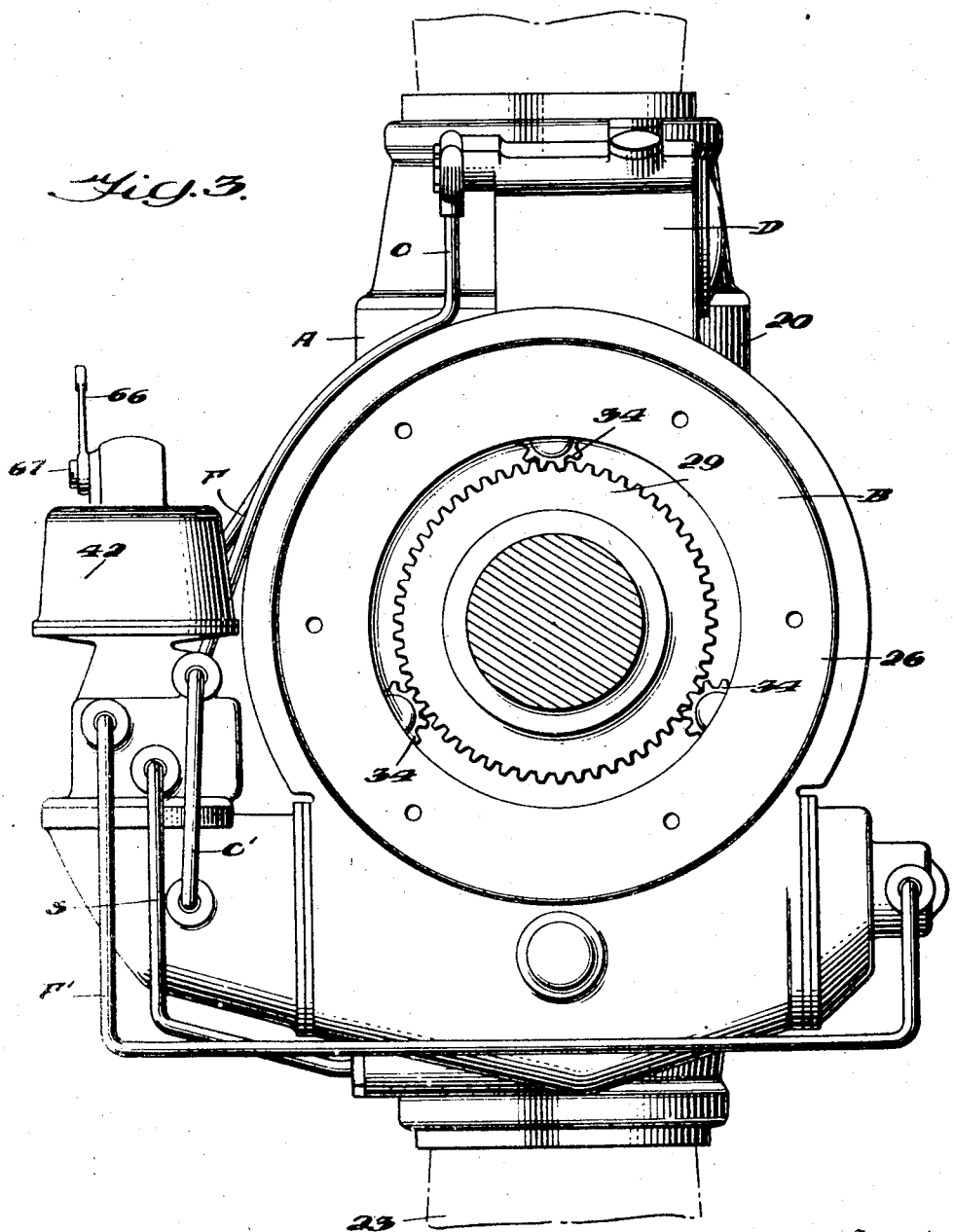
Figure 3 is a rear elevation of the same embodiment.
Figure 4:
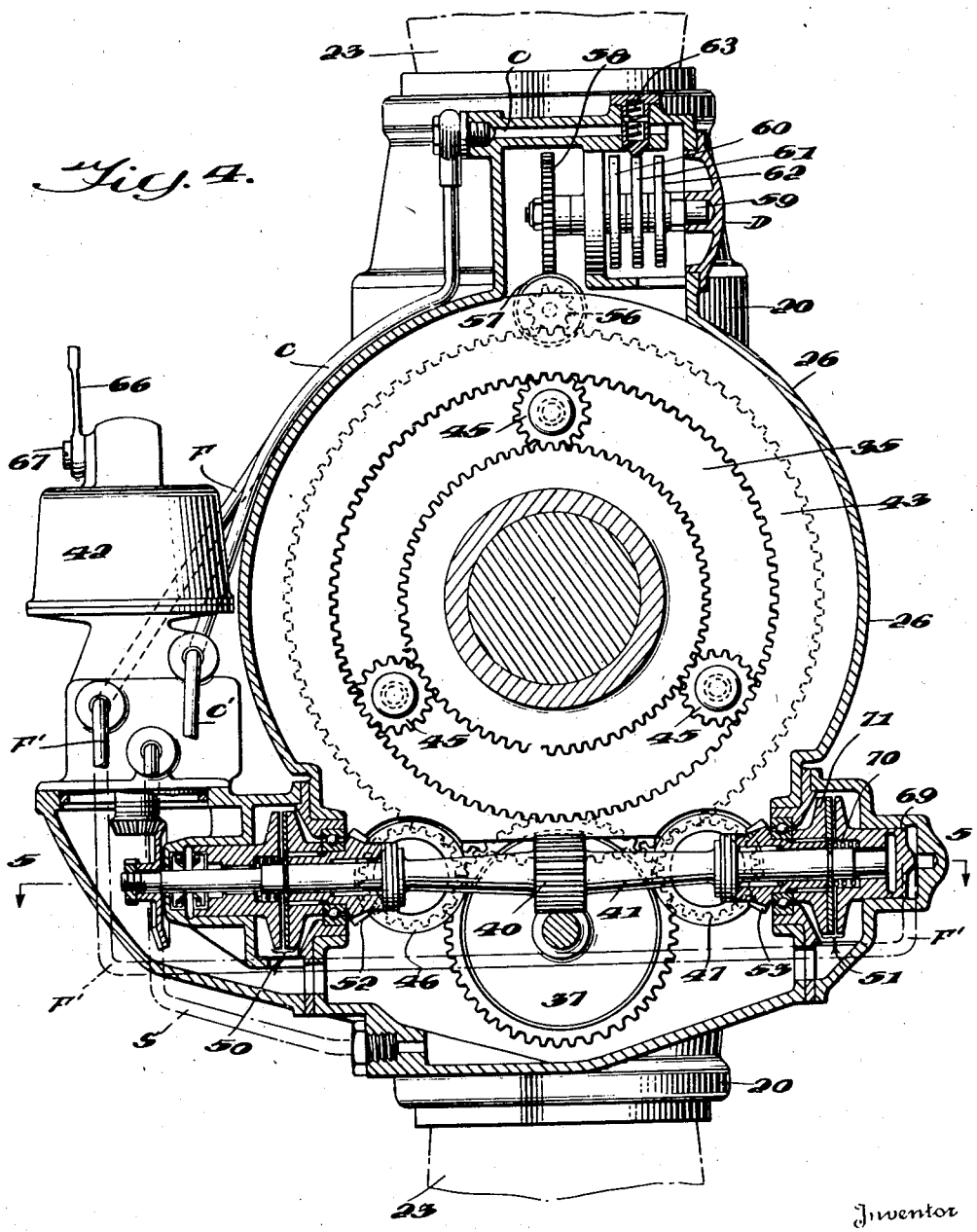
Figure 4 is a transverse vertical cross section through the control unit of the embodiment.

With reference to Fig. 4, it will be seen that within the housing 26 is also mounted gear wheels 46 and 47 which engage the teeth on the outer periphery of the ring 43 so that when either of the gear wheels 46 or 47 are rotated, the ring 43 will be rotated and through the pinions 45 rotation of the ring 27 will be effected. As previously stated, ring 27 engages a gear wheel on the shaft of the worm 24 and consequently rotation of the propeller blades about their vertical axes is accomplished, thus changing the pitch of the blades.

In the modification being described, the control of the pitch of the propeller blades is effected by a hydraulic system controlled through the operation of the governor and also through operation of a cam system. With reference to Figs. 4, 6 and 7, it will be seen that the control system generally works in the following manner:

Rotation of the shaft 41 in the manner described effects rotation of the governor 42 through the shaft 48 (Fig. 6). Operation of the governor raises and lowers a tubular valve 49 and causes fluid under pressure to actuate coarse and fine pitch clutch means 50 and 51, respectively carried on the shaft 41. Actuation of either of these clutch means will cause rotation of the bevel gears 52, 53 and through bevel gears 54, 55 (see Fig. 5) will rotate either gear wheel 46 or gear wheel 47 to rotate the ring gear 43 in one direction or the other. As previously described, rotation of the ring gear 43 effects a change in the pitch of the propeller blade.

The teeth on the outer periphery of the ring member 43 engage a gear wheel 56 which is mounted on a shaft having a worm portion 57 (see Fig. 2) which in turn engages a worm wheel 58. The worm wheel 58 is mounted on a shaft 59 which carries three or more cams. In Fig. 4, three of such cams are indicated, respectively, as 60, 61 and 62. Each of these cams has a raised portion adapted to engage, respectively, spring urged valves 63, 64 and 65, only one of which, 63, is illustrated in Figure 4, the other two being disposed circumferentially and consequently not being shown in cross section in Fig 4.

The system is so devised that the governor may be overridden to change the pitch of the propellers to feathering position. Overriding of the governor 42 is accomplished through actuation of the lever 66 on a shaft 67. When this occurs, the transmission of fluid pressure to the clutch means 50 and 51 is controlled by actuation of the cams 60, 61 and 62 which, respectively, are for fine pitch, coarse pitch and feathering pitch limit positions. Since worm gear 58 will rotate whenever the propeller pitch is being changed, the cams 60, 61 and 62 are consequently also rotated and their cam surfaces are such that when the particular limit required for coarse, fine and feathering pitch position is attained, a cam will open its corresponding valve 63, 64 or 65 respectively to relieve or release the fluid pressure, thus stopping further pitch changing movement of the propeller blades. The structure comprising the cams, valves and the conduits in which the valves are disposed, comprise the distributor D.

The specific structure employed to accomplish these results must be described more specifically.

Figure 7 is a diagrammatic representation of the hydraulic system. The lower part of the housing 26 contains a quantity of fluid under pressure. An anti-freeze fluid is preferably used. This is adapted to be drawn by suction up through conduit S by the pump 67 (Fig. 6) and forced under pressure to the port 68 in the governor 42.

The governor has a plurality of outlets C, C' and F, F' connected by conduits and leading to the cam controlled valves 63, 64 and 65 and also to the clutches 50 and 51. One other conduit E leads from the governor back to the suction conduit S.

The drive shaft 48 of the governor 42 (Fig. 4) is driven from shaft 41 which as described rotates with the propeller drive shaft. The upper part of the governor shaft 48 is hollow and the tubular valve 49 is mounted for vertical sliding movement therein. The sliding movement is controlled by the speed of the governor (see Fig. 6). As the tubular valve 49 moves up and down, it opens and cuts off the fluid pressure to and from the conduits leading to the clutches 50 and 51.

Let us assume that the speed of the governor 42 is such that fine pitch position of the blades is required. The tubular valve 49 is then in such position that fluid under pressure will pass into fine pitch conduit F (Fig. 7) where its passage is blocked by the valve 64 which is in closed position. Fluid under pressure will also enter fine pitch conduit F' leading to the fine pitch clutch 51. This fluid enters a cylinder (see Fig. 4) and forces clutch member 69 against the action of the spring 70 into engagement with clutch member 71 keyed to bevel gear 53. Since clutch member 69 is rigid with the rotating shaft 41, and clutch member 71 normally is not, it is apparent that the clutching causes the shaft 41 to turn bevel gear 53. As previously described, this bevel gear through various gearing rotates the propeller blades 23 about their longitudinal axes and changes their pitch toward fine pitch position.

Operation of bevel gear 53 also effects rotation of the control cams 60, 61 and 62 and the pitch changing operation toward fine pitch position continues until the recessed portion of the cam surface on the fine pitch cam 60 permits the valve 64 to lower under action of its spring, thus releasing the fluid pressure in the fine pitch conduits F, F' and in clutch 51, whereupon the spring 70 will move clutch member 69 to unclutched position, thus stopping further pitch changing movement in a fine pitch direction.

Similarly, the governor controls the tubular valve 49 to effect a pitch change to coarse pitch position. When the speed of the governor is such as to require a change to coarse pitch position of the propeller blades, the tubular valve 49 will be in position to pass fluid under pressure in coarse pitch conduit C leading to cam valve 63, and also in coarse pitch conduit C' leading to the coarse pitch clutch 50. This clutch is similar to the clutch 51 and when thus engaged will cause rotation of bevel gear 52 to effect rotation of the propeller blades about their longitudinal axis toward a coarse pitch position. Bevel gear 52 also (through the gearing described) rotates the cams 60, 61 and 62, and the pitch changing continues until the coarse pitch cam 61 opens cam valve 63 and thus releases pressure in the line C, C'.

Under ordinary flight conditions the governor will, through this system, maintain the pitch of the propeller between definite limits of fine and coarse pitch positions. These limits can be controlled by adjustment of the governor spring 72 (Fig. 6) through lever 66 as will be apparent from the drawings and also from previous applications to which reference has already been made.

It has been mentioned that means are provided for overriding the governor at will. Such means are comprised by the lever 66 (Figs. 4 and 6). By moving this lever in one direction or the other beyond the limits for adjusting spring 72, lever 66 will move the tubular valve 49 up or down irrespective of the speed of rotation of the governor. Fluid under pressure can thus be directed either to the fine pitch conduits F, F' or the coarse pitch conduits C, C' as desired. The governor shown is like that shown in Patent No. 2,161,917.

The governor overriding lever 66 is also employed when it is desired to change the pitch of the propeller blades to feathering position. In this event the tubular valve 49 is moved to a position in which fluid under pressure is passed to the coarse pitch conduits C and C'. This, as before, effects a pitch change toward coarse pitch position. However, if feathering is to be obtained, the coarse pitch cam 61 and the valve 63 in line C must be rendered temporarily ineffective so that the pitch change will continue to feathering position. Mechanism for accomplishing this is illustrated in Fig. 8, in which the valve 64' is so designed that it may be drawn upward by the cable 73 so as to be out of the way of the cam 61 and at the same time remain closed. When the cable 73 is thus drawn, the pitch changing movement will continue until feathering position is reached. The pitch changing movement is then stopped by cam 62 (Figs. 4, 7 and 8) which releases valve 65 and opens the feathering conduit P (Fig. 7) thus removing the pressure and declutching clutch 50.

It will be seen from Fig. 4 that the coarse pitch conduit C in which valve 63' is situated, connects with the interior of the housing 26 so that when valve 63' is open, the fluid under pressure enters the housing and returns to the bottom thereof. This obviously causes the required pressure drop. The fine pitch conduit F and the feathering pitch conduit P are likewise connected to open into the housing when their respective valves 64 and 65 are open.

It is apparent that the system is dependent upon operation of the internal combustion engine. If this should stop for any reason and the propeller blades are in a position in which they would constitute a drag on the aircraft, an auxiliary electric system can be employed for placing the blades in feathering position. Such a system is shown in Fig. 9.

In Fig. 9 an electric motor 74 is connected through a clutch 75 and bevel gears 76 and 77 to drive a shaft 78 connected by gearing with bevel gear 52 (Fig. 4). Operation of electric motor 74 will thus rotate gear wheel 46, rotate ring gear 43 and effect a pitch change toward feathering position.

The electric motor 74 may be powered by battery 79 in circuit with the solenoid 80, switch 81 in the cockpit and a switch 82 operated by a cam 82' for cutting off the electric motor when feathering pitch position is reached. This cam 82' is an extra cam and the switch 82 is so designed that the raised surface on the cam opens the switch when feathering has been completed.

Figures 10, 11 and 12 are cross sectional views through another embodiment, which while containing substantially the same elements as those in the first embodiment, illustrates a different arrangement of such elements. The same or similar elements will be given the same reference numerals.

In this embodiment the shaft 41 is disposed vertically and carries a skew gear 83 directly engaging a worm 84 supported to rotate with the spider 35 (see Fig. 12).

In most other respects this embodiment is similar to the first. It will be observed that one further difference is that the governor 42 is driven directly by the shaft 41, there being no necessity for a bevel gearing drive. Moreover, as seen in Figure 10, the clutch piston 85 does not rotate with the governor drive shaft 41.

Other methods of driving the governor are shown, for example, in Figures 13 and 14. In Figure 13, the governor shaft 41 is driven through a worm 86 formed on the outer surface of the ring sleeve 29.

In Figure 14, an arrangement is shown in which the governor shaft 41 is driven by the rotating annular spider 35. The spider has teeth on its outer periphery which engage a spur gear 87 mounted on a shaft 88 carrying a bevel gear 89 engaging bevel gear 90 carried by the governor shaft 48.

Another means for effecting a pitch change is illustrated in Figure 15. The bevel gear 91 is carried by a clutch (not shown, but similar to 50 in Fig. 4) and when the clutch is actuated, the governor drive shaft 41 will rotate bevel gear 91. Bevel gear 91 engages a bevel gear 92 on a shaft 93, the other end of which carries a spur gear 94 engaging teeth on a ring gear 95, similar to ring gear 43 (Fig. 4), thus effecting a propeller pitch change.

A method of effecting a pitch change in either direction is shown diagrammatically in Figures 16, 17 and 18. In these figures two shafts 96 and 97 are provided. The shaft 96 is driven, for example, through a skew gear connection 98 from the propeller drive shaft, or from the spider 35 rotating with it. The other shaft 97, through a worm connection 99, drives the gear 43 which is geared to the pitch changing mechanism.

The shaft 96 carries spur gears 100 and 101, one at each end. Spur gear 100 engages directly with a spur gear 102 on shaft 97 (see Fig. 17). Spur gear 101 (see Fig. 18) engages a small spur gear 103 which in turn engages spur gear 104 on shaft 97. The reference numerals 105 and 106 indicate clutches for clutching the spur gears 102 and 104, respectively to shaft 97 at the will of the operator.

It will be manifest, that through operation of one clutch or the other, the shaft 97 can be driven in different directions, one direction through spur gears 101, 103 and 104 when clutch 106 is engaged and clutch 105 is disengaged.

Where it is desired to effect a control of the pitch of the propeller blades to positions of fine pitch, coarse pitch, feathering pitch, and reverse or braking pitch positions, an arrangement such as illustrated in Figures 19, 20 and 21 can be employed.

Where it is desired to effect a control of the pitch of the propeller blades to positions of fine pitch, coarse pitch, feathering pitch, and reverse or braking pitch positions, an arrangement such as illustrated in Figures 19, 20 and 21 can be employed.

Such an arrangement is in many respects similar to the first embodiment (Figs. 1–9). Like the first embodiment, the gearing is enclosed in a housing 110 and the manner in which this gearing drives the governor shaft is identical.

The differences between the two embodiments reside primarily in the fact that the embodiment of Figures 19, 20 and 21 in addition to the governor drive shaft (not shown) driven through gearing in the same manner as governor drive shaft 41 (Fig. 2), it is provided with a second shaft 111 (Fig. 19) driven in a similar manner. This shaft 111 carries clutch elements 112, 113, keyed thereto, and freely rotatable clutch elements 114, 115. These latter carry bevel gears 116, 117 which engage bevel gears (in a manner identical to that shown in Figures 4 and 5) for driving gear wheels engaging teeth on the outer periphery of ring gear 118. The ring gear 118 is identical with ring gear 43 (Figs. 2 and 4) and serves the same purpose, namely, to effect a propeller pitch change when rotated.

Other differences reside in the governor 119 and the cam control distributor arrangement generally indicated as D'. It will also be noted that there are four clutches, two on the governor drive shaft (for fine and coarse pitch) and the two on shaft 111 (Fig. 19) for feathering pitch and reverse pitch. Consequently, the governor 119 may be identical to that shown in Figure 6. As before the governor is adapted to furnish fluid under pressure to any of the clutches as conditions demand, so that operation of the clutches will effect a pitch change toward the required position.

Since this embodiment covers four pitch positions, there must be four control cams (similar to cams 60, 61 and 62 in Fig. 4) one each for fine, coarse, feathering and reverse pitch positions. Such cams are shown respectively in Figures 18 and 20 as 120, 121, 122 and 123. They perform the same function as the cams of the first embodiment, but there is one additional cam provided for reverse pitch. The cam and distributor D' assembly is located on the side of the housing so that the shaft 111 and feathering and reverse pitch clutches can be disposed at the upper part of the housing 110.

For sake of simplification, the conduits have been shown in Figure 19 by full and dotted lines. Leading from opposite sides of the valve structure in the governor 119 are fine pitch conduits F and F', the latter extending to the fine pitch clutch (lower right in Figure 19) and the former to a passage in the distributor D' having a valve (similar to valve 63) controlled by fine pitch cam 120.

Conduit C' leads to the coarse pitch clutch (lower left) and C to the distributor having a valve 125 controlled by coarse pitch cam 121.

Conduits P and P' lead respectively to feathering pitch clutch 112, 114 and to a distributor passage having a valve controlled by feathering pitch cam 122.

Conduits R and R' lead respectively to the reverse pitch clutch 113, 115 and to a passage in the distributor having a valve controlled by reverse pitch cam 123.

Finally, conduit S is the suction line leading from the bottom of the housing 110 up to the pump in the governor 119, and E is a return line connecting with suction line S.

As in the first embodiment the governor operates to maintain the propeller blade pitch between fine and coarse pitch limits depending on the engine speed. When it is desired to change the feathering pitch or reverse pitch it is necessary to override the governor in one direction or the other. One system for accomplishing this is shown diagrammatically in Figure 20. This figure is an opened-up view.

With reference thereto an overriding lever 126 pivoted at 127 is connected by a rod 128 to the control speed governor lever (not shown). The lower end of the overriding lever 126 is adapted to engage either of two pivoted bell cranks 129 and 130 connected by pin and slot connections 131 and 132 to the valve rods 133 and 134, each having two valve members 135, 136 and 137, 138, respectively.

Operation of the overriding lever 126 to one extreme position or the other will actuate the bell crank levers 129 or 130 to move the valve rods 133, 134. When lever 126 is moved to one such position, the valve member 136 would open the fine pitch conduits F, F' to the exhaust portion 139 while valve member 135 blocks off exhaust port 140 and establishes pressure in the reverse pitch conduits R, R'. Reverse pitch clutch 113, 115 (Figure 19) will thus be actuated and the pitch changing mechanism will be actuated towards reverse pitch position. Such action will continue until the reverse pitch cam 123 actuates its corresponding valve and releases the pressure in conduit R' and R when the pitch changing mechanism stops.

Movement of lever 126 to the extreme position in the opposite direction will actuate valve rod 134 provided for the coarse pitch and feathering pitch. Conduits C, C' and P, P', respectively, to change from coarse pitch to feathering pitch. In this event, valve member 137 opens the line C, C' to exhaust port 141 and closes line P, P' to exhaust port 142.

Figure 21 is a detail cross section through the valve part of the governor.

Figures 22 and 23 show a similar overriding system for accomplishing the identical result. In this modification, there are two valve rods 143 and 144 of similar design. Each has valve members such as 145 and 146 on the valve rod 143 (Figure 23). Each is urged to the left by a spring such as spring 147 in Figure 23. Since they are identical, a description of the operation of the valve rod 143 should suffice.

The valve members 145 and 146 are so disposed that movement of the rod 143 to the right against the action of spring 147 will open communication between fine pitch conduits F, F' and exhaust port 148 and at the same time block communication between reverse pitch conduits R, R' and exhaust port 149. Fluid pressure will thus be built up in the R, R' line and the reverse pitch clutch 113, 115 (Figure 19) will be actuated to effect a pitch change towards reverse pitch position. This continues until reserve pitch cam operates its valve and relieves the pressure, as previously described.

As shown in Figure 22, the valve rods 143 and 144 are adapted to be moved to the right (against the action of their springs) by means of a double armed rocker lever 150. This is connected by the linkage system 151, 152 and 153 to the governor overriding lever 126. The connection with the lever 126 is through a pin and slot arrangement 154 permitting the lever 126 to move the distance X—X without actuating the rocker lever 150. The governor lever 126 can thus adjust the governor for normal operation.

Movement of the governor overriding lever 126 to position y will cause rocker lever 150 to move the valve rod 143 to the right and thus effect a pitch change to reverse pitch position. Movement of the governor lever 126 to position z will move the valve rod 144 to the right and similarly effect a pitch change to feathering position.

It should be obvious that the system shown in Figure 9 for feathering the propeller blades upon failure of the internal combustion engine, can be employed with any of the modifications described. It is also of value in systems employing contra-rotating propellers driven from coaxial propeller shafts as described and shown in my co-pending applications Serial No. 465,618, filed November 14, 1942, now Patent 2,426,007, dated August 19, 1947, and Serial No. 449,123, filed June 30, 1942.

The system illustrated in Figures 19, 20, 21, 22 and 23 is readily adapted to a contra-rotating propeller system. An example of this is shown in Figure 24. The system there illustrated includes a second propeller hub structure A' driven by an inner coaxial propeller shaft 155 but otherwise identical to the first propeller hub structure.

The forward end of the shaft for worm 24 carries a spur gear 156 engaging a ring gear 157. Teeth on the inner periphery of this ring gear 157 engage pinions 158 carried by a spider 159, and rotation of pinions 158 effect rotation of a gear 160. This latter gear has a toothed annular gear portion 161 which engages a spur gear 162 on the end of the worm shaft 163 carried by the forward propeller hub structure A'. Turning of worm shaft 163 effects pitch changes of the blades of this forward propeller hub structure. This mechanism is somewhat similar to that disclosed in my application, S. N. 465,618 to which reference has been made.

It is apparent that changes may be made in the modifications described without departing from the invention. The embodiments illustrated and described are by way of example only. As an illustration, it is clear that multiplate clutches can be employed in lieu of those shown. Moreover, magnetic clutches can be used instead of the hydraulically operated ones shown. In this event the system insofar as operation is concerned would be wholly electric and similar to that disclosed in my copending application, Serial No. 472,882, filed January 19, 1943.

It should therefore be manifest that the invention is not to be limited except in accordance with the claims which follow.

I claim:

1. A variable pitch propeller device comprising a hub unit adapted to be mounted on a propeller drive shaft extending from an engine to rotate with said shaft, said hub unit including pitch changing means, a self-contained control unit mounted to surround said propeller drive shaft between said hub unit and the front facing of the engine, said control unit comprising gearing connected with said propeller blade mountings, a shaft driven by the propeller drive shaft, a governor driven by said shaft, hydraulically actuated clutch means for clutching said shaft to said gearing, a fluid pump driven by said shaft for forcing fluid under pressure to said clutch means to actuate the same, valve means for controlling fluid pressure at said clutch means, said valve means including a governor controlled valve and at least one cam controlled valve, said cam being actuated by said gearing.

2. A variable pitch propeller device comprising a hub unit adapted to be mounted on a propeller drive shaft extending from an engine to rotate with said shaft, said hub unit including pitch changing means, a self-contained control unit mounted to surround said propeller drive shaft between said hub unit and the front facing of the engine, said control unit including a ring gear operatively connected to the pitch changing means in said hub unit, a pair of pinions engaging said ring gear, a shaft driven by the propeller drive shaft, a pair of clutches each for connecting one of said pinions to be driven by said shaft, and a governor driven by said shaft, means controlled by said governor for effecting clutching selectively of either of said clutches to drive said ring gear in one direction or the other to effect a pitch change, and cam controlled valve means actuated by said ring gear for declutching said clutches when a predetermined pitch change has been effected.

3. A variable pitch propeller device comprising a hub unit adapted to be mounted on a propeller drive shaft extending from an engine to rotate with said shaft, said hub unit including pitch changing means, a self-contained control unit mounted to surround said propeller drive shaft between said hub unit and the front facing of the engine, said control unit including a ring gear operatively connected to the pitch changing means in said hub unit, a pair of pinions engaging said ring gear, a shaft driven by the propeller drive shaft, a pair of hydraulically actuated clutches each for connecting one of said pinions to be driven by said shaft, and a governor and a fluid pump driven by said shaft, valve means controlled by said governor for directing fluid under pressure selectively to either of said clutches, and valve means for releasing said fluid pressure to effect declutching when a predetermined pitch change has been effected.

4. A variable pitch propeller device comprising a hub unit adapted to be mounted on a propeller drive shaft extending from an engine to rotate with said shaft, said hub unit including pitch changing means, a self-contained control unit mounted to surround said propeller drive shaft between said hub unit and the front facing of the engine, said control unit including a ring gear operatively connected to the pitch changing means in said hub unit, a pair of pinions engaging said ring gear, a shaft driven by the propeller drive shaft, a pair of hydraulically actuated clutches each for connecting one of said pinions to be driven by said shaft, and a governor and a fluid pump driven by said shaft, valve means controlled by said governor for directing fluid under pressure selectively to either of said clutches, and valve means for releasing said fluid pressure to effect declutching when a predetermined pitch change has been effected, said last named valve means being controlled by cam means actuated by rotation of said ring gear.

5. A variable pitch propeller device comprising a hub unit adapted to be mounted on a propeller drive shaft extending from an engine to rotate with said shaft, said hub unit including pitch changing means, a self-contained control unit mounted to surround said propeller drive shaft between said hub unit and the front facing of the engine, said control unit including a ring gear operatively connected to the pitch changing means in said hub unit, a pair of shafts driven from the propeller drive-shaft at different speeds, four pinions engaging said ring gear, two pairs of hydraulically actuated clutches, one pair respectively for each of said shafts, each end of said shafts having one of said clutches mounted thereon and each adapted when clutched to connect a pinion with a shaft, a governor and a fluid pump driven by one of said shafts, and first valve means for directing fluid under pressure selectively to two of said clutches.

6. A variable pitch propeller device comprising a hub unit adapted to be mounted on a propeller drive shaft extending from an engine to rotate with said shaft, said hub unit including pitch changing means, a self-contained control unit mounted to surround said propeller drive shaft between said hub unit and the front facing of the engine, said control unit including a ring gear operatively connected to the pitch changing means in said hub unit, a pair of shafts driven from the propeller drive shaft at different speeds, four pinions engaging said ring gear, two pairs of hydraulically actuated clutches, one pair respectively for each of said shafts, one clutch disposed at each end of said shafts, and each clutch when actuated connecting a pinion with a shaft, a governor and a fluid pump driven by one of said shafts, first valve means for directing fluid under pressure selectively to two of said clutches, second valve means for releasing said fluid pressure to effect declutching when the predetermined pitch change has been effected, and means for temporarily rendering certain of said last named valve means inoperative.

7. In a device as claimed in claim 6, said second named valve means including cams actuated through operation of said ring gear.

8. In a device as claimed in claim 6, said first valve means being governor controlled to effect pitch changes between coarse and fine pitch limits, and means for overriding the governor control for selectively actuating said valve means to continue a pitch change to feathering or reverse pitch positions.

9. A self-contained control unit for variable pitch propeller systems and adapted to be disposed surrounding the propeller drive shaft between the propeller hub structure and the engine, said control unit comprising a housing, gearing within said housing and adapted to be connected with propeller pitch changing means to actuate the latter, at least one shaft within said housing and driven by the propeller drive shaft, hydraulically actuated clutch means for clutching said shaft to said gearing to drive the gearing in one direction or the other, a fluid pump driven by said shaft for forcing fluid under pressure to said clutch means to actuate the same, and governor controlled valve means for controlling the passage of fluid under pressure to said clutch means to maintain the pitch of the propellers between predetermined fine and coarse pitch positions.

10. In a unit as defined in claim 9, said housing comprising a fluid reservoir, and cam controlled means actuated by said gearing for releasing fluid pressure to said clutch means when said predetermined fine and coarse pitch positions have been exceeded.

11. A self-contained unit for variable pitch propeller systems and adapted to be disposed surrounding the propeller drive shaft between the propeller hub structure and the engine, said control unit comprising a housing, gearing within said housing and adapted to be connected with propeller pitch changing means to actuate the latter, a pair of shafts disposed on opposite sides of said unit within said housing, means for driving each of said shafts from the propeller drive shaft and at different rates of speed, four hydraulically actuated clutch means adapted to connect one of said shafts with said gearing to actuate the latter in one direction or the other, each one of said clutch means being mounted on one of the ends of said shafts, a fluid pump driven by one of said shafts for forcing fluid under pressure to each of said clutch means, a governor driven by one of said shafts, governor controlled valve means for controlling the passage of fluid under pressure to two of said clutch means for maintaining the pitch of the propellers between predetermined fine and coarse pitch positions, means for overriding said governor to actuate said valve means to direct fluid under pressure selectively to either of the other two clutch means, a cam controlled valve system actuated by said gearing for releasing the fluid under pressure to any of said clutch means when predetermined limits for fine, coarse, feathering and reverse pitch positions have been attained.

12. A self-contained unit for variable pitch propeller systems and adapted to be disposed surrounding the propeller drive shaft between the propeller hub structure and the engine, said control unit comprising a housing, gearing within said housing and adapted to be connected with propeller pitch changing means to actuate the latter, a pair of shafts disposed on opposite sides of said unit within said housing, means for driving each of said shafts from the propeller drive shaft and at different rates of speed, four hydraulically actuated clutch means for connecting at least one of said shafts with said gearing to actuate the latter in one direction or the other, each one of said clutch means being operatively associated with one end of each of said shafts, a fluid pump driven by one of said shafts for forcing fluid under pressure to each of said clutch means, a governor driven by one of said shafts, governor controlled valve means for controlling the passage of fluid under pressure to two of said clutch means for maintaining the pitch of the propellers between predetermined fine and coarse pitch positions, said other two clutch means being for reverse and feathering pitch positions, means for overriding said governor to direct fluid pressure selectively to any of the four clutch means, and a cam controlled valve system actuated by said gearing for releasing the fluid under pressure to any of said clutch means when predetermined limits for fine, coarse, feathering and reverse pitch positions have been attained.

13. In a device as defined in claim 12, said governor overriding means comprising a pair of piston valves each pair being disposed selectively to control the fluid pressure to two of said clutch means, a lever, and a linkage system actuated by said lever for controlling movement of each pair of said piston valves in each direction.

14. A variable pitch propeller device comprising a propeller hub structure including propeller blades mounted to rotate with said hub structure and also for pitch changing movement, a housing adapted to be mounted between said hub structure and the front facing of the engine, gear means within said housing including gearing rotating with the propeller drive shaft and gearing connected with the pitch changing mechanism, a shaft connected to be driven by the propeller drive shaft, a governor driven by said shaft, a second shaft parallel to the first shaft and connected to the gearing connected with the pitch changing mechanism, two sets of gearing connecting the two shafts for driving the second in either direction, and a pair of clutches, one for each of the two sets of gearing, and means controlled by the governor for selectively causing said clutches to engage.

15. A variable pitch propeller device comprising a hub unit adapted to be mounted on a propeller drive shaft extending from an engine to rotate with said shaft, said hub unit including pitch changing means, a self-contained control unit mounted to surround said propeller drive shaft between said hub unit and the front facing of the engine, said control unit including a ring gear operatively connected to the pitch changing means in said hub unit, a pair of pinions engaging said ring gear, a control shaft driven by the propeller drive shaft, a pair of clutches each for connecting one of said pinions to be driven by said shaft, a governor driven by said shaft, valve means controlled by said governor for effecting clutching selectively of either of said clutches to drive said ring gear in one direction or the other to effect a pitch change, said clutches being mounted coaxially on the shaft driven by the propeller shaft, and one of the clutch elements of each pair being rigid with said control shaft and the other being normally rotatable on said same shaft, bevel gears rigid with the elements rigid with said same shaft, and bevel gears on said last named shaft supporting said pinions and engaging said last named bevel gears.

ARCHIBALD GRAHAM FORSYTH.

REFERENCES CITED

The following references are of record in the file of this patent:

UNITED STATES PATENTS

| Number | Name | Date |
|---|---|---|
| 1,958,336 | Greene | May 8, 1934 |
| 1,969,280 | Smith | Aug. 7, 1934 |
| 2,033,342 | Lansing et al. | Mar. 10, 1936 |
| 2,086,097 | Shoemaker | July 6, 1937 |
| 2,123,057 | Martin | July 5, 1938 |
| 2,124,791 | McNeal | July 26, 1938 |
| 2,127,687 | Heath | Aug. 23, 1938 |
| 2,138,487 | Gaba | Nov. 29, 1938 |
| 2,140,722 | Smith, Jr. | Dec. 20, 1938 |
| 2,161,917 | Forsyth et al. | June 13, 1939 |
| 2,176,556 | Lampton | Oct. 17, 1939 |
| 2,206,874 | Briner | July 9, 1940 |
| 2,236,841 | Waseige | Apr. 1, 1941 |
| 2,250,694 | Algarsson | July 29, 1941 |
| 2,284,154 | Lampton et al. | May 26, 1942 |
| 2,291,953 | Dicks | Aug. 4, 1942 |
| 2,305,146 | D'Ascanio | Dec. 15, 1942 |
| 2,315,213 | Linehan | Mar. 30, 1943 |
| 2,316,438 | Lea | Apr. 13, 1943 |
| 2,361,954 | Martin | Nov. 7, 1944 |
| 2,363,670 | Hoover | Nov. 28, 1944 |
| 2,376,673 | Duchaussoy | May 22, 1945 |

FOREIGN PATENTS

| Number | Country | Date |
|---|---|---|
| 379,731 | Italy | Apr. 4, 1940 |
| 499,634 | Great Britain | Jan. 26, 1939 |
| 844,832 | France | Oct. 10, 1939 |
| | (Addition to No. 50,162) | |

OTHER REFERENCES

Floryan (A. P. C.), Ser. No. 345,132, published May 18, 1943.